(12) United States Patent
Van Den Steen

(10) Patent No.: US 10,317,059 B2
(45) Date of Patent: Jun. 11, 2019

(54) INTERLOCK ARRANGEMENT FOR A LUMINAIRE

(71) Applicant: SIGNIFY HOLDING B.V., Eindhoven (NL)

(72) Inventor: Thomas Van Den Steen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/559,071

(22) PCT Filed: Mar. 2, 2016

(86) PCT No.: PCT/EP2016/054453
§ 371 (c)(1),
(2) Date: Sep. 18, 2017

(87) PCT Pub. No.: WO2016/150667
PCT Pub. Date: Sep. 29, 2016

(65) Prior Publication Data
US 2018/0073710 A1 Mar. 15, 2018

(30) Foreign Application Priority Data

Mar. 20, 2015 (EP) ...................... 15160012

(51) Int. Cl.
*F21V 21/02* (2006.01)
*F21V 21/06* (2006.01)
(Continued)

(52) U.S. Cl.
CPC ............. *F21V 21/29* (2013.01); *F16M 11/14* (2013.01); *F21V 17/164* (2013.01); *F21V 21/02* (2013.01);
(Continued)

(58) Field of Classification Search
CPC ..... F21V 21/005; F21V 23/004; F21V 23/005
(Continued)

(56) References Cited

U.S. PATENT DOCUMENTS 1,697,037 A 1/1929 Witz
6,161,948 A 12/2000 Hagen
(Continued)

FOREIGN PATENT DOCUMENTS

GB 2502180 A 11/2013
WO WO2012029033 A1 3/2012

*Primary Examiner* — Edwyn Labaze
(74) *Attorney, Agent, or Firm* — Meenakshy Chakravorty

(57) ABSTRACT

There is proposed a lamp support and corresponding connectable swivel assembly for a luminaire. The lamp support comprises a locking arrangement adapted to engage with the interlock element of the swivel assembly. The locking arrangement comprises a deformable portion mounted on a surface of the lamp support. The deformable portion is adapted to be movable relative to the surface of the lamp support so as to move from a first position, in which the swivel assembly is connectable to the locking arrangement so as to permit connection of the swivel member from the lamp support, to a second position, in which the locking arrangement cooperates with the interlock element to prevent removal of the swivel member from the lamp support.

13 Claims, 4 Drawing Sheets

(51) Int. Cl.
  *F21V 21/29* (2006.01)
  *F21V 21/088* (2006.01)
  *F21V 17/16* (2006.01)
  *F21V 21/116* (2006.01)
  *F21V 21/14* (2006.01)
  *F16M 11/14* (2006.01)

(52) U.S. Cl.
  CPC ............ *F21V 21/06* (2013.01); *F21V 21/088* (2013.01); *F21V 21/116* (2013.01); *F21V 21/14* (2013.01)

(58) Field of Classification Search
  USPC .............................. 362/249.01, 249.03, 227
  See application file for complete search history.

(56) References Cited

U.S. PATENT DOCUMENTS

| | | | |
|---|---|---|---|
| 6,392,541 B1 | 5/2002 | Bucher et al. | |
| 6,439,744 B1 | 8/2002 | Chanslor | |
| 7,108,405 B2 | 9/2006 | Matts et al. | |
| 7,350,943 B1* | 4/2008 | Swanson | F21S 6/002 362/249.01 |
| 2003/0076677 A1* | 4/2003 | Mohacsi | F21S 8/033 362/652 |
| 2005/0036305 A1* | 2/2005 | Kersey | A61H 33/6063 362/149 |
| 2008/0266856 A1* | 10/2008 | Chien | H04N 5/2354 362/249.01 |
| 2013/0114262 A1* | 5/2013 | McClellan | F21S 2/005 362/249.03 |
| 2013/0188373 A1 | 7/2013 | Lin | |
| 2013/0236238 A1 | 9/2013 | Burton | |
| 2014/0086666 A1 | 3/2014 | Grziwok et al. | |

* cited by examiner

INTERLOCK ARRANGEMENT FOR A LUMINAIRE

CROSS-REFERENCE TO PRIOR APPLICATIONS

This application is the U.S. National Phase application under 35 U.S.C. § 371 of International Application No. PCT/EP2016/054453, filed on Mar. 2, 2016, which claims the benefit of European Patent Application No. 15160012.9, filed on Mar. 20, 2015. These applications are hereby incorporated by reference herein.

FIELD OF THE INVENTION

This invention relates to the field of luminaires, and more specifically to the field of luminaires comprising a swivel member.

BACKGROUND OF THE INVENTION

Consumer luminaires commonly comprise a lamp housing, adapted to house a lamp or light source, and a lamp base, adapted to mount or support the luminaire against a surface (e.g. a wall or table). Either of the lamp housing or the lamp base may be otherwise referred to as being a lamp support. It is known for a luminaire to further comprise a swivel member connected between the lamp housing and lamp base (in other words, connected between lamp supports) and adapted to permit adjustment of the angle or direction of emitted light.

Typical swivel members are connected to at least one of the lamp supports (i.e. the lamp housing or the lamp base) by at least one of the following: a threaded fastener (such as a bolt, a screw or a nut) glue or another such fastening device. Connecting a lamp support to a swivel member for a typical luminaire therefore requires additional components and tools. Furthermore, assembly of such a luminaire requires assembly time and possibly complex construction.

SUMMARY OF THE INVENTION

The invention is defined by the claims.

According to a first aspect of the inventive concept, there is herein proposed a lamp support for connection to a swivel assembly, the swivel assembly comprising a swivel member having an interlock element, the lamp support comprising: a locking arrangement comprising a deformable portion mounted on a surface of the lamp support, the locking arrangement being adapted to engage with the interlock element of the swivel assembly, wherein the deformable portion is adapted to be movable relative to the surface of the lamp support so as to move from a first position, in which the swivel assembly is connectable to the locking arrangement so as to permit connection of the swivel member from the lamp support, to a second position, in which the locking arrangement cooperates with the interlock element to prevent removal of the swivel member from the lamp support.

In other words the lamp support comprises a locking arrangement comprising a deformable portion in an arbitrary initial position. Such a deformable portion may, for example, be elastically deformable. The swivel member comprises an interlock member adapted to cooperate with the locking arrangement.

The deformable portion is adapted to shift from a first position, otherwise called an open position, into a second position, otherwise called an interlocking position. It may be understood that in embodiments the causing of the shift of the deformable portion to a second position may be either directly or indirectly caused by the swivel assembly, such that the swivel member may permit or allow the deformable portion to move from the first position to the second position.

When the deformable portion is at the first position, the locking arrangement may not cooperate or be in cooperation with the interlock element and the swivel member may be removed from the lamp support. In such a position, the lamp support may therefore be considered to not be connected to the swivel assembly.

When the deformable portion is at the second position, the locking arrangement cooperates with the interlock element, for example, becoming interlocked with the interlock element and may, in embodiments, be in contact with the interlock element. At the second position, this cooperation prevents removal of the swivel member from the lamp support. In such a position, the lamp support may therefore be considered to be connected to the swivel assembly.

Embodiments may thus provide a simple and reliable lamp support to which a swivel assembly may be releasably connected. The swivel assembly may therefore be simply and quickly connected/disconnected to/from the lamp support, therefore permitting simple and quick installation or replacement. Such embodiments may therefore provide for a swivel assembly to be replaced, for example. Embodiments may therefore provide a replaceable swivel assembly and/or lamp support.

In a preferred embodiment, the lamp support may be a lamp housing adapted to house a lamp or light source. Such a lamp support may otherwise be called, for example, a luminaire, a luminaire head, lamp support, spothead or lamp mounting. There may be provided in the lamp support a lamp socket, for example a lightbulb socket, for example an Edison screw. Such a lamp support may be shaped to be at least partially conical, and thereby act as a lamp shade. The lamp support may comprise angular reflectors for directional lighting.

In other embodiments, the lamp support may be a mount for a luminaire; the mount may be connectable to a wall, ceiling or other solid object. Other exemplary mounts may permit a luminaire mounted therein to be freestanding (e.g. floor lamp).

A lamp support according to the above described embodiments may provide a user with a simple method of connecting the lamp support to a swivel member without the need for additional components, for example nuts, screws, rivets or glue.

The lamp support may be adapted to further comprise an aperture adapted to at least partially permit passage of the swivel member therethrough, wherein unidirectional passage of the swivel member through the aperture causes the deformable portion to move from the first position to the second position.

In other words the lamp support may comprise an aperture, hole, passage or gap through which the swivel member of the swivel assembly may at least partially pass through or be at least partially inserted through. Such an aperture may form a passage from an exterior surface of a side of the lamp support to an interior surface of the same side of the lamp support, and the locking arrangement is positioned in contact with the interior surface of the same side of the lamp support.

Such a lamp support may be further adapted wherein: initial unidirectional passage of the swivel member through the aperture deforms the deformable portion to the first position; and further unidirectional passage of the swivel member through the aperture causes the deformable portion to move to the second position.

In other words, unidirectional passage of the swivel member, for example with movement only in a single axis, causes the deformable portion of the locking arrangement to deform to the first or open position. In preferred embodiments, this unidirectional passage of the swivel member is a nonrotational passage, such that the swivel member does not rotate (e.g. relative to the lamp support) when passing through the aperture.

Further unidirectional passage causes or allows the deformable portion to move to the second position. This may be embodied by the swivel member permitting the deformable portion (having been deformed into the first position) to at least partially reform.

Embodiments may therefore employ a "push-to-connect" mechanism which facilitates simple and quick connection of a swivel assembly to a lamp support. This for example, may be achieved by ensuring that the deformable portion has a suitable amount of elastic deformation. That is to say that the deformable portion may deform sufficiently to allow the swivel assembly to be pushed through a neck portion of the deformable portion. Once the swivel assembly has passed into the body of the deformable portion then the deformation should be reversed by the desire of the deformable portion to return to its pre-deformation shape. This means that the swivel assembly is resiliently gripped by the deformable portion.

The lamp support is preferably adapted wherein the deformable portion comprises a flexible member. In other words the deformable portion may comprise a protrusion, outthrust or protuberance of the locking arrangement. The deformable portion may comprise a thinner region relative to the rest of the deformable portion. This is a technique known as necking and can concentrate the deformation in a certain region allowing the deformable region as a whole to be made of a stiffer material with the thinner cross section providing the required amount of deformation.

The locking arrangement of the lamp support may further comprise a limiting member arranged to prevent movement of the swivel member relative to the locking arrangement beyond a predetermined position.

There may therefore be provided a limiting member, element or feature, for example a surface of a structure, which prevents undesired or excessive passage of the swivel member relative to the lamp support. There may be a predetermined position for the said limiting member which may, in some embodiments, cause the limiting member to be in contact with the swivel member when the deformable portion is in the second position and in cooperation with the swivel member. This may advantageously reduce the 'rattle' or play of the luminaire by snugly holding the swivel member within the lamp support, the deformable portion may grip the swivel member across substantially the entire surface of the swivel member. This may increase the friction that is applied to the swivel member by the deformable portion and thus may remove the tendency for the weight of the luminaire to act in the direction of gravity and move under its own weight to a position other than the desired position set by the user.

The limiting member optionally comprises a rotation-restricting element adapted to cooperate with a portion of the swivel member, such that rotation-restricting element is able to restrict rotation of the swivel member relative to the locking arrangement. In other words, a portion of the limiting member may be shaped or otherwise adapted to cooperate with a portion of the swivel member such that rotation of the swivel relative to the limiting member, and hence the lamp support, may be prevented. Preventing rotation of the swivel member in this manner may advantageously reduce the play of the connection.

The locking arrangement may preferably comprise at least two such limiting members, for example at least three limiting members, for example at least five limiting members, wherein each said limiting member is positioned to limit movement of the swivel member in a particular axis relative to the locking arrangement.

In embodiments, the limiting members have a substantially complimentary shape or profile to a respective portion of the swivel member.

In preferable embodiments, the locking arrangement advantageously comprises a plurality of deformable portions, each adapted to be able to cooperate with a different, respective, interlock element of the swivel member.

Such embodiments may prevent excessive or unwanted rotational or lateral movement of the swivel member relative to the lamp support when in the second position. A lamp support with a plurality of deformable portions may be more rigidly connected to the swivel member. In embodiments, the plurality of deformable portions may be shaped or otherwise adapted to prevent the lamp support from rotating relative to the swivel.

The lamp support is preferably injection moulded. Injection moulded material may ensure appropriate deformability of the deformable portions is achieved. A skilled person may readily choose other materials that provide suitably flexible deformable portions, for example, rapid prototyping materials or 3D printed plastics.

Materials having a high elastic deformation may be particularly suited to be used for the deformable portion of the lamp support. Plastic deformation is defined as a reversible deformation due to the effect of an external force. Once the force has been removed then the object returns to its original shape.

Suitable plastics may include acrylics, ABS (acrylonitrile butadiene styrene), Nylon, PLA (Polylactic acid), PC (Polycarbonate), Poly ether ether ketone (PEEK) and Polyetherimide (PEI).

Accordingly to a second aspect of the inventive concept, there is provided a swivel assembly adapted to connect to a lamp support according to any preceding claim, the swivel assembly comprising: a swivel member having an interlock element adapted to cooperate with the locking arrangement of the lamp support; a body member; and a swivel, wherein the swivel rotatably couples the swivel member to the body member.

Exemplary interlock elements, formed on or in the swivel member, may comprise at least one of the following: an indentation, a notch, a cut-out, a recession, a protrusion, an outthrust, or protuberance.

The swivel member may be elongated. Provision of such a swivel member that is elongated may allow for greater ease of rotating the swivel member relative to the body member.

A ball-and-socket or spheroidal joint is one exemplary embodiment of a swivel that permits the swivel member and body member to be rotatably coupled together with freedom of movement relative to one another in a plurality of axes.

To increase the resilience of the swivel to limit the tendency of the luminaire to fall into a downward position due to the effect of gravity the surface of the ball may have a roughened surface to increase the coefficient of friction between the ball and the socket. A further embodiment may have a ball which is larger than the size that would be used with a certain sized socket. The socket must have a sufficient amount of elastic deformation to allow the ball to be inserted into the socket but once the ball is in the socket the socket will grip the ball over substantially its entire surface.

A yet further embodiment may have one or more detent assemblies that act upon the swivel member. Such a detent may comprise a spring and a ball inserted in the lamp support that acts upon the swivel assembly. If the swivel assembly has at least two dimples then the detent can be used to hold the luminaire in two predetermined positions, it can be seen that if the swivel assembly had many dimples then many predetermined positions would be possible.

Optionally, each of the swivel member, body member and swivel are at least partially hollow. Allowing each feature of the swivel assembly to be partially hollow permits the passage of electrical wires for connection, for example, to a light fitting mounted or set in the lamp support.

According to a third aspect of the inventive concept, there is provided a luminaire comprising a lamp support as disclosed herein and a swivel assembly as disclosed herein. In a preferable embodiment, the deformable portion of the lamp support is a flexible member and the interlock element of the swivel assembly is an indentation, such that at the second position, a portion of the locking arrangement (for example, the deformable portion) fits inside the indentation (i.e. the interlock element) to prevent the removal of the swivel member, and hence the swivel assembly, from the lamp support.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lamp support and corresponding connectable swivel assembly for a luminaire.

A preferred embodiment of a luminaire 1 according to the invention can be described with reference to FIGS. 1-3. The luminaire 1 comprises a lamp support 100 and a swivel assembly 110 connectable together.

Figure 1:
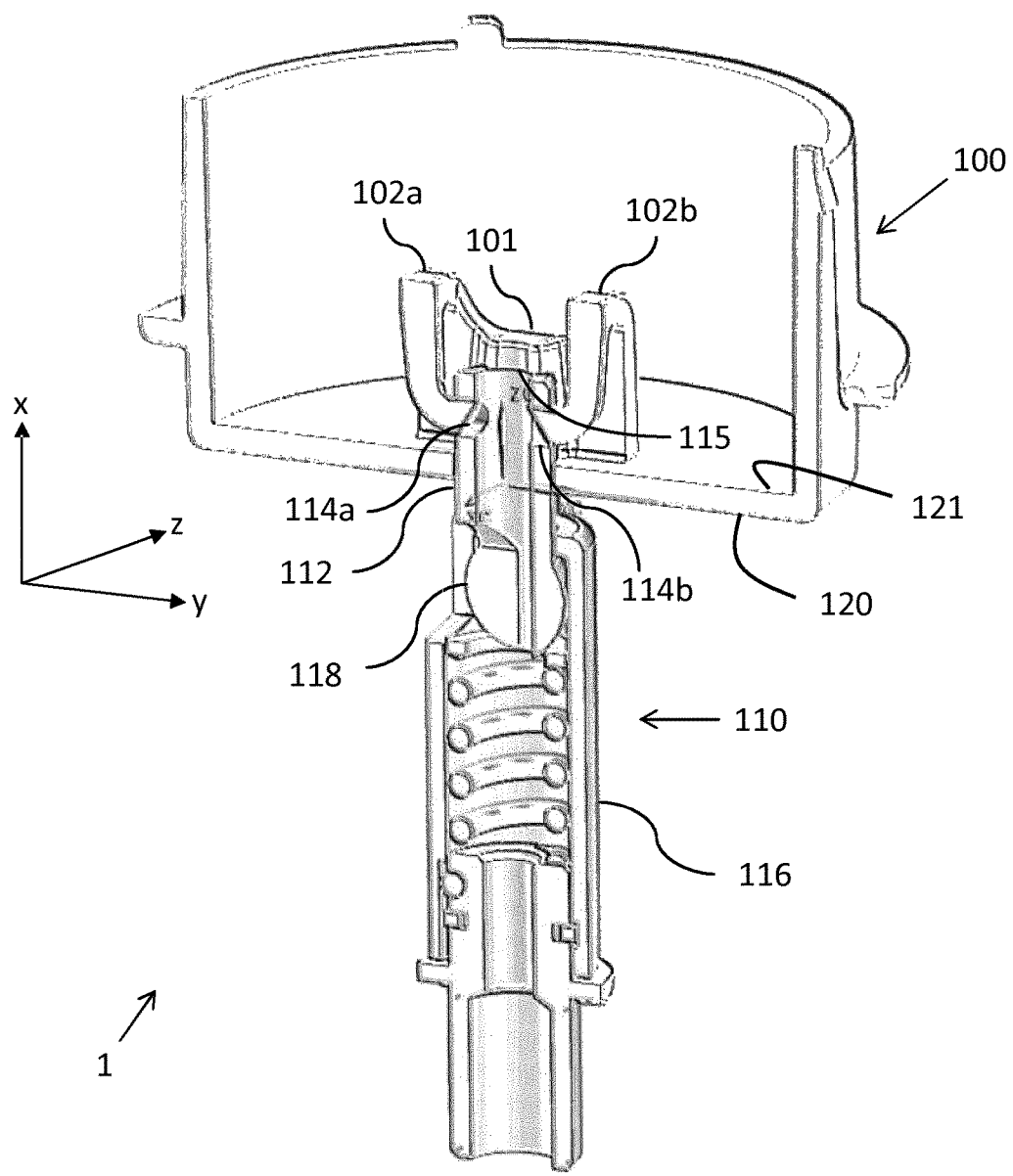
FIG. 1 illustrates a sectional view of a luminaire according to a preferred embodiment of the invention.

FIG. 1 depicts a luminaire wherein the swivel assembly 110 has been connected to the lamp support 100. The swivel assembly 110 comprises a body member 116 and a swivel member 112 rotatably connected by a swivel 118. The swivel member 112 comprises a first 114a and second 114b interlock element. In the present embodiment, each interlock element 114a, 114b is an indentation or cut-out of the swivel member 112.

Figure 2:
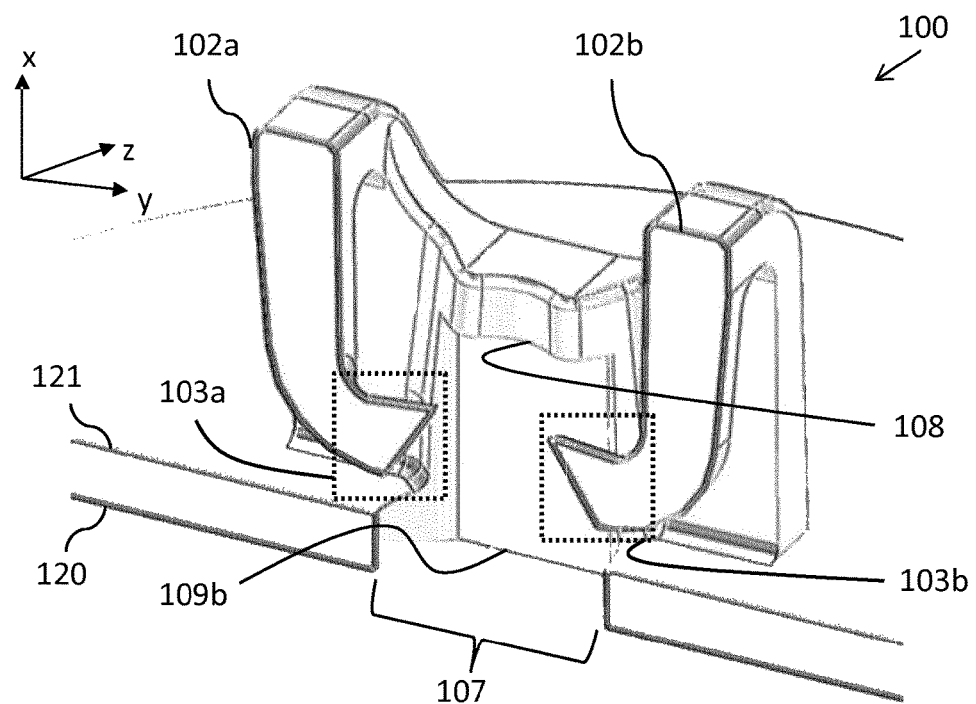
FIG. 2 depicts an enhanced sectional view of the lamp support for the luminaire according to a preferred embodiment of the invention.

FIG. 2 shows an enhanced view of the lamp support 100 according to a preferred embodiment. The lamp support 100 comprises a locking arrangement 101 and an aperture 107, and may be considered to comprise an exterior surface 120 and an interior surface 121. FIG. 3 depicts a view of the embodied locking arrangement when viewed through the aperture.

The locking arrangement 101 of the present embodiment comprises a first and second deformable portion, embodied as a first 102a and second 102b flexible member, alternatively named a deformable protrusion. Each such flexible member comprises a portion 103a, 103b sized to be able to at least partially fit within a respective interlock element 114a, 114b, of the swivel member 112. Preferably, the flexible member(s) is elastically deformable. In the present embodiment, the locking arrangement 101 is mounted on the interior surface 121 of the lamp support 100.

A connecting operation may be readily described with reference to FIGS. 4 and 5, which depict a partial cross-section of the luminaire with the flexible members in a first (FIG. 4) and second position (FIG. 5), respectively. An appropriate understanding of the first and second positions shall be elucidated in the following description of the connecting operation.

In a connecting operation, the swivel member 112 is unidirectionally (e.g. only moved in the axis x depicted in FIGS. 1 and 2) passed through the aperture. Rotation of the swivel member relative to the lamp housing, for example around either of the axes y or z, is not required. Initial unidirectional passage causes the swivel member 112 to deform each flexible member 102a, 102b to a first position (depicted in FIG. 4). In the present example, the swivel member 112 causes each flexible member to bend outwardly into the first position, such that further passage of the swivel member through the swivel member is permitted.

The swivel member 112 thus applies strain to the flexible members 102a, 102b to cause the flexible members to deform. Furthermore, the flexible members are prevented from reforming (i.e., from returning to their pre-deformed position) due to the continued presence of the swivel member 112 applying strain to the flexible members.

Figure 4:
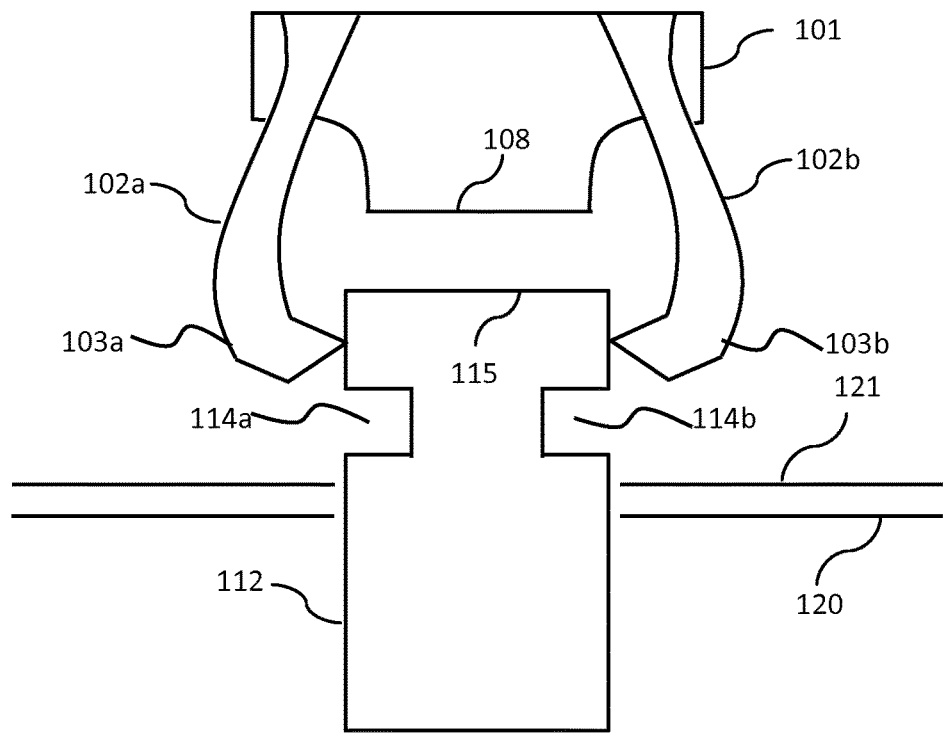
FIG. 4 illustrates a cross-sectional view of the luminaire according to a preferred embodiment when a deformable portion of the locking arrangement is in a first position.

At this first position, shown in FIG. 4, neither flexible member 102a, 102b, and thereby the interlocking arrangement, is permitted to cooperate with an interlock element, and the swivel member 112 (and hence the swivel assembly 110) is removable from the lamp support 110 by reversing the unidirectional passage.

Figure 5:
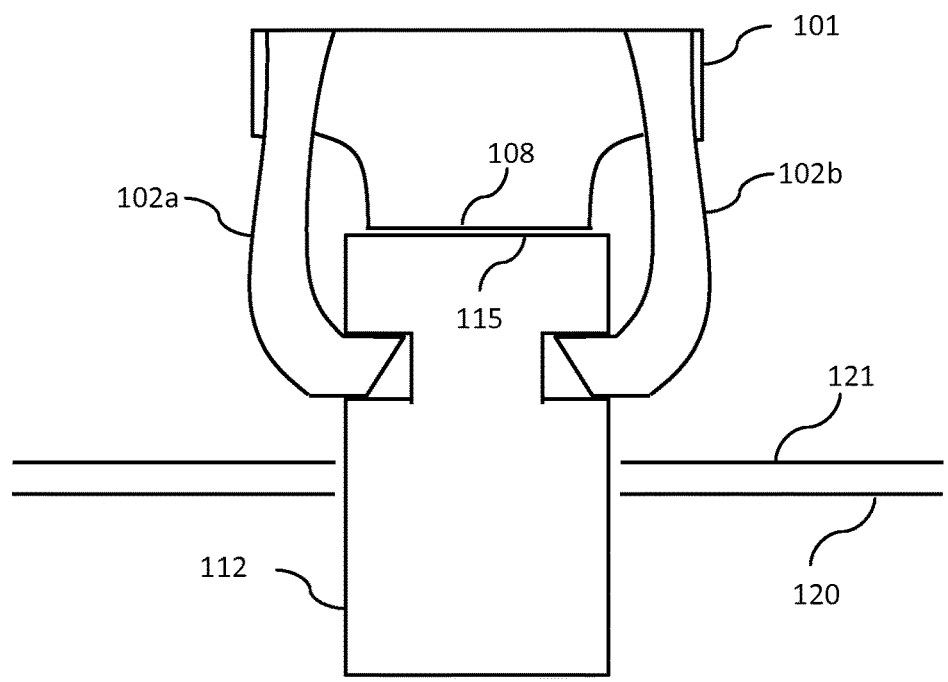
FIG. 5 illustrates a cross-sectional view of the luminaire according to a preferred embodiment when the deformable portion is in a second position.

Further unidirectional passage, in the same direction as previously, permits each flexible member 102a, 102b to move from the first position to a second position (shown in FIG. 5). At the second position, both flexible members 102a, 102b, and thereby the interlocking arrangement, may cooperate with a respective interlock element to thereby prevent removal of the swivel member from the lamp support.

In the present embodiment, the movement of the flexible members 102a, 102b from the second position to the first position is permitted when the swivel member 112 is sufficiently passed through the aperture 117 such that each interlock element (embodied as indentations) 114a, 114b line up with a respective flexible member 102a, 102b.

Movement of the flexible member 102a, 102b from the first position to the second position is caused by the flexible member at least partially reforming (i.e., partially returning to the pre-deformed position), due to the force of the swivel member being removed (by presenting the flexible members to the indentations).

As such, at the second position a portion 103a, 103b of each flexible member 102a, 102b fits within each said indentation. The said portions of both flexible members thereby cooperate with a respective surface of the indentation to prevent retrieval of the swivel member from the lamp support.

In other words, as the swivel member 112 is inserted into and through the aperture, the flexible members 102a, 102b are both shifted such that they are engaged with a respective pair of interlock elements 114a, 114b. The locking arrangement may thereby 'clip' into the swivel member to engage the swivel assembly into the lamp support 100.

Thus, as shown in a preferred embodiment, the deformable portions may move from a first position to a second position, wherein at the second position the locking arrangement cooperates with the interlock element of the swivel member to prevent removal of the swivel member from the locking arrangement.

Referring back to FIGS. 1-2, further optional features of the preferred embodiment may be described. When at the second position, the two flexible members 102a, 102b of the present embodiments may apply pressure towards one another to thereby partially clamp the swivel member 112 in position. In such preferable embodiments, the flexible members are positioned to be angled together, such that pressure is applied from the flexible members towards the swivel member to more securely hold the swivel member in position. This pressure may also prevent lateral movement or rotational movement of the swivel member relative to the lamp support, such as lateral movement in the axis y.

Other embodiments may comprise more than two deformable portions or flexible members to hold the swivel member, for example, at least three deformable portions, for example, at least four deformable portions.

As in the present embodiment, the flexible member 102a may advantageously be arranged such that the portion 103a of the flexible member 102a is more proximate to the aperture 107 than the rest of the flexible member.

The present aperture 107 is sized to permit the swivel member 112 to at least partially pass therethrough. The aperture is formed from an exterior surface 120 of the lamp support 100 to an interior surface 121 of the lamp support 100. In this preferable embodiment, the aperture 107 has a complimentary shape to the profile of the swivel member, such that insertion of the swivel member through the aperture may be allowed or prevented depending upon the orientation of the swivel member.

The locking arrangement 101 may comprise a limiting member, for example the limiting surface 108, positioned a predetermined distance away from the aperture 107. The limiting surface 108 is adapted to cooperate with an end surface 115 to prevent further movement of the swivel member 112 through the aperture (e.g. in the axis x).

The limiting surface 108 is positioned to be in contact with the end surface 115 when the flexible member(s) is in the second position to thereby restrict movement of the swivel member in an axis parallel to the unidirectional movement (e.g. axis x). In other words, the distance between the limiting surface 108 and the portion 103a of the flexible member 102a that may cooperate with an interlock element 114a of the swivel member 112 is the same distance as the distance between the end surface 115 and the said interlock element 114a.

The lamp support 100 of the present embodiment is a lamp housing, adapted to support a light source. The lamp support 100 is partially conically shaped to predominantly guide the light emission in a particular direction. In alternative embodiments, the lamp support may be a lamp mount for mounting the luminaire to an external surface such as a wall, ceiling or table (not shown).

Figure 3:
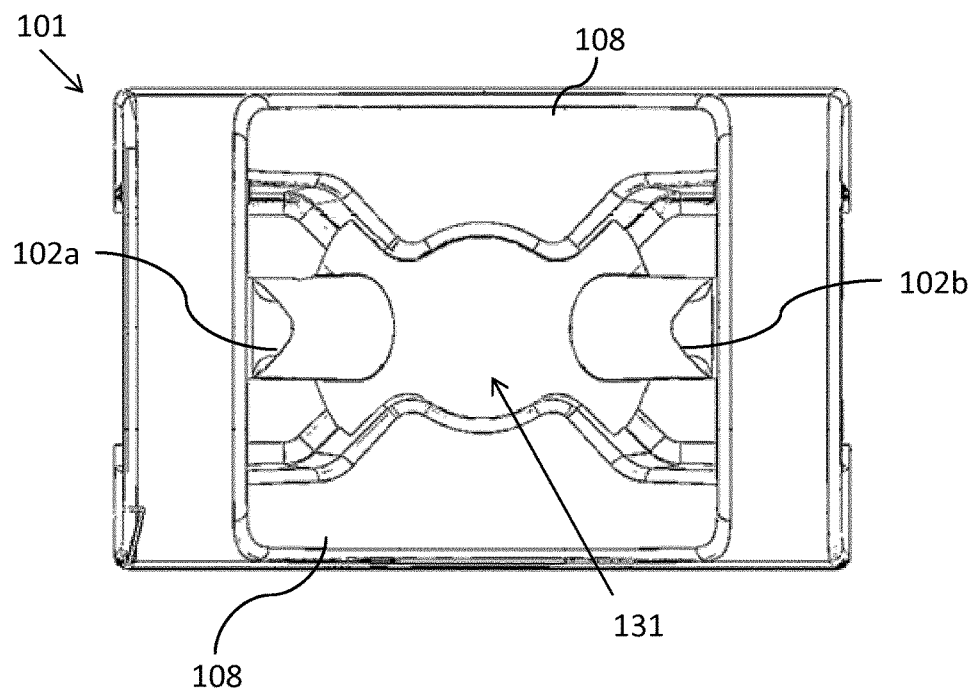
FIG. 3 illustrates a cross-sectional view of a locking arrangement according to a preferred embodiment of the invention, viewed through an aperture of the lamp support.

Referring now to FIG. 3, a preferable embodiment of a locking arrangement is shown. Here, the limiting surface 108 also comprises a passage 131 therethrough for provision of, for example, a wire to or from the swivel member supplying power for the luminaire.

Figure 6:
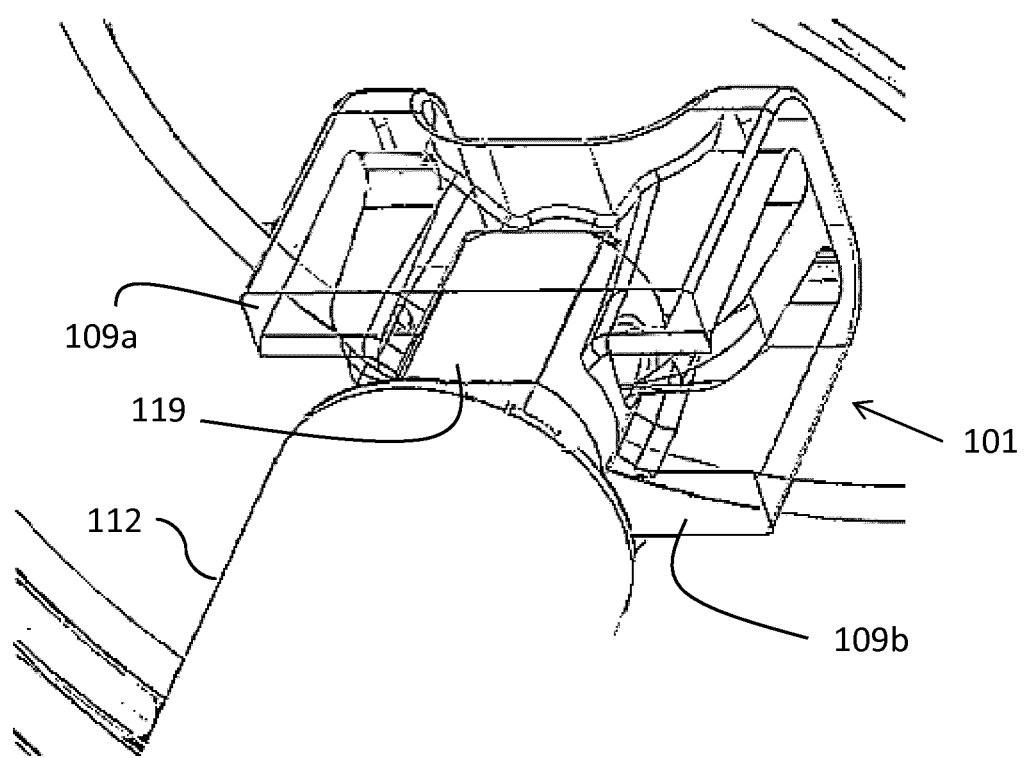
FIG. 6 is a further isometric cross section of a luminaire according to a preferred embodiment of the invention.

With specific reference to FIG. 6, in the preferred embodiment the locking arrangement 101 also comprises the optional feature of two further limiting members 109a, 109b. The limiting members 109a, 109b each cooperate with a side surface 119 of the swivel member to limit movement in particular axis. For example, in the present embodiment, the limiting members limit movement in an axis perpendicular to the unidirectional movement through the passage (e.g. axis z). The limiting members 109a, 109b each advantageously have a complimentary shape to the respective side surface 119 of the swivel member to which they cooperate. Such features provide benefits through preventing both rotational movement of the swivel member relative to the lamp support, for example in an axis parallel to the unidirectional movement (e.g. axis x). Furthermore, such features may prevent incorrect or misaligned (e.g. such that the flexible members may not be in-line with the interlock element) insertion or passage of the swivel member through the aperture.

An exemplary swivel assembly, described with reference to FIG. 1, comprises a swivel member 112 for connection to a lamp support as detailed above and a body member 116. A swivel 118 rotatably couples the swivel member to the body member. In the present embodiment, the swivel 118 is a ball and socket joint, such that the swivel member 112 may rotatably move in any axis relative to the body member 116. The swivel member comprises, in this preferable embodiment, a plurality of interlock elements 114a, 114b, each embodied as an indentation of the swivel member.

The swivel member is elongated, such that it has a longitudinal length larger than its transverse width. In the present embodiment, the unidirectional passage of the swivel member through the aperture 107 of the lamp support 100 is advantageously in or along the same axis as the longitudinal length (i.e. the swivel member is elongated in the axis x).

The present swivel assembly 110 is partially hollow, such that each of the swivel 118, swivel member 112 and body member 116 is partially hollow. This may allow an electrical connection, e.g. a wire, to pass through the length of the swivel assembly 110 for provision to or from the lamp support 100.

The luminaire 1 may comprise a swivel assembly 110 and lamp support 100 having any combination of features as described above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

Although the above described preferred embodiment details a locking arrangement having a plurality of deformable portions, it will be apparent that a locking arrangement comprising only a single deformable portion may be realized without departing from the scope of the invention.

It will be understood that although in the above described preferred embodiment the deformable portion is a flexible member (alternatively named a deformable protrusion), other embodiments, for example a deformable wall or flexible support of a locking arrangement, may be readily realized by the skilled person.

Although the preferred embodiment describes a lamp support having an aperture through which the swivel member passes, it will be understood that there may be alternative arrangements of a lamp support such that no aperture is required. For example, the locking arrangement may be arranged on an external surface of the lamp support.

It will also be understood that the portion of the locking arrangement that is made to cooperate with the interlock element of the swivel member need not be a portion of the flexible member, as in the preferred embodiment. It may, for example, be an inflexible or non-deformable portion in connection with the flexible member.

The invention claimed is:

1. A luminaire comprising a swivel assembly and a lamp support for connection to the swivel assembly,
   the swivel assembly comprising a swivel member having an interlock element,
   the lamp support comprising:
   a locking arrangement comprising a deformable portion mounted on a surface of the lamp support, the locking arrangement being adapted to engage with the interlock element of the swivel assembly,
   wherein the deformable portion is adapted to be movable relative to the surface of the lamp support so as to move from a first position, in which the swivel assembly is connectable to the locking arrangement so as to permit connection of the swivel member from the lamp support, to a second position, in which the locking arrangement cooperates with the interlock element to prevent removal of the swivel member from the lamp support,
   wherein when the swivel assembly and the lamp support are connected, the deformable portion resiliently grips the swivel member,
   wherein the lamp support further comprises an aperture adapted to at least partially permit passage of the swivel member therethrough, and
   wherein unidirectional passage of the swivel member through the aperture causes the deformable portion to move from the first position to the second position.

2. The luminaire of claim 1, wherein:
   initial unidirectional passage of the swivel member through the aperture of the lamp support deforms the deformable portion to the first position; and
   further unidirectional passage of the swivel member through the aperture causes the deformable portion to move to the second position.

3. The luminaire of claim 1, wherein the aperture of the lamp support forms a passage from an exterior surface of a side of the lamp support to an interior surface of the same side of the lamp support, and the locking arrangement is positioned in contact with the interior surface of the same side of the lamp support.

4. The luminaire of claim 1, wherein the deformable portion comprises a flexible member.

5. The luminaire of claim 1, wherein the locking arrangement further comprises a limiting member arranged to prevent movement of the swivel member relative to the locking arrangement beyond a predetermined position.

6. The luminaire of claim 5, wherein the limiting member comprises a rotation-restricting element adapted to cooperate with a portion of the swivel member, such that the rotation-restricting element is adapted to restrict rotation of the swivel member relative to the locking arrangement.

7. The luminaire of claim 1, wherein the locking arrangement comprises a plurality of deformable portions, each adapted to be able to cooperate with a different, respective, interlock element of the swivel member.

8. The luminaire of claim 1, wherein the lamp support is injection moulded.

9. A luminaire according to claim 1, wherein the deformable portion is arranged to grip the swivel member across substantially the entire surface of the swivel member.

10. The luminaire of claim 1, wherein the interlock element comprises an indentation.

11. The luminaire of claim 1, wherein the swivel member is elongated.

12. The luminaire of claim 1, wherein the swivel comprises a ball-and-socket joint.

13. The luminaire of claim 1, wherein each of the swivel member, body member and swivel are at least partially hollow.

* * * * *